March 6, 1945. A. L. COHEN 2,370,938
GLASS LIFTING DEVICE
Filed Aug. 17, 1944
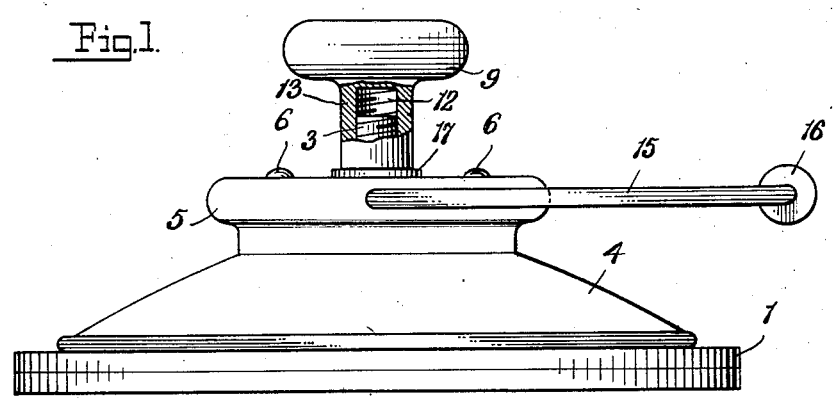
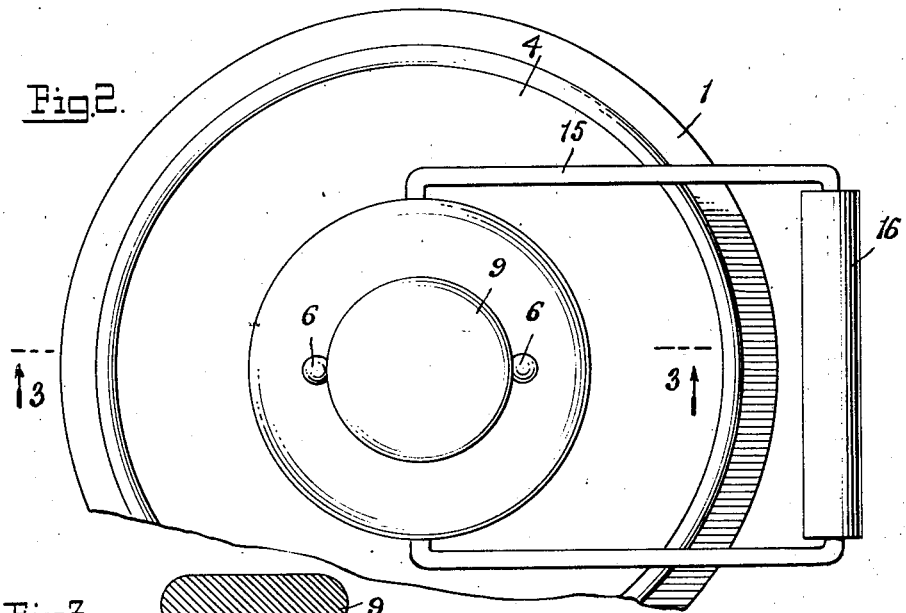
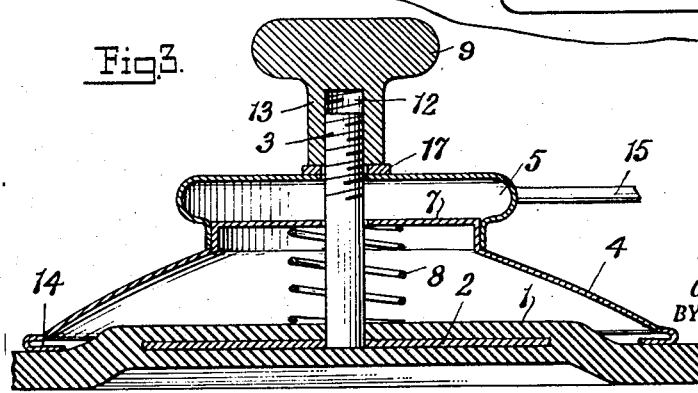
INVENTOR.
Abraham L. Cohen
BY
Harry Radzinsky
Attorney Patented Mar. 6, 1945

2,370,938

UNITED STATES PATENT OFFICE 2,370,938

GLASS-LIFTING DEVICE

Abraham L. Cohen, New York, N. Y.

Application August 17, 1944, Serial No. 549,923

1 Claim. (Cl. 294—64)

This invention relates to a device for aiding in lifting and carrying panes or sheets of glass or other smooth-surfaced articles or materials, and one of the objects of the invention is to provide a device of this character which can be easily attached to and removed from the surface of the articles to be carried; which will tenaciously attach itself to said surface by suction and permit the carrying of articles of very substantial weight and size without loosening its grip thereon.

A device of this general character is shown in my Patent No. 2,351,666, dated June 20, 1944, wherein is disclosed a relatively thick, normally flat, disk of soft rubber or similar material, over which a rigid cup-shaped member of less diameter than the disk, extends; the rubber disk having an embedded flat, stiff circular plate carrying a stem extending through the cup and provided with a pivoted cam lever operative to force the cup toward the disk and cause the plate to form the disk into cupped shape so that a firm adherence of the disk to a smooth surface by suction, will result, enabling the smooth-surfaced material to be easily handled, lifted and carried. In the device of said patent, the stem is moved axially by a swinging cam lever which, when too vigorously operated, is likely to exert a force, particularly on relatively thin glass, sufficient to break the glass. The present invention therefore, has for its object the provision of means by which a gradual or progressive force is applied to the stem to gradually form the disk into cupped shape, thus minimizing the possibility of the glass being broken by the application of force or too great pressure.

In the accompanying drawing, wherein an illustrative embodiment of the invention is shown, Fig. 1 is a side elevation of the improved glass-lifting device, with parts broken away and in section to disclose structure; Fig. 2 is a plan view of the same, and Fig. 3 is a sectional view on the line 3—3 of Fig. 2, looking in the direction of the arrows, and with the device shown in its operative or attached position.

With reference to the drawing, 1 indicates a circular section or disk or thick, soft rubber or other similar material such as artificial rubber or the like. The disk 1 is normally flat and may, if desired be composed of a number of intimately united laminations, between which is located a smaller circular disk or plate 2, said plate being preferably of metal or other stiff and rigid material. The plate 2 is normally flat and remains so during the operation of the device, and it is of sufficient stiffness and rigidity to flex the rubber disk 1 into cupped formation, as hereafter described.

The rubber disk 1, if not composed of two or more united layers as heretofore explained, may be moulded around the plate 2, with the stem 3 rigidly attached to the plate 2, extending out of the rubber disk 1. The stem 3 is provided for a portion of its length with the screw threads seen in Figs. 1 and 3.

At 4 is shown a cup-shaped member, which is preferably a metal stamping. Said cup 4 is of less diameter than the rubber disk 1 and of greater diameter than the circular plate 2. The cup 4 is stiffened about its peripheral edge by the inturned flange 14 which presents a flat, annular face against the rubber disk near the periphery of the disk. Secured over the top 7 of the disk 4 is a cap member 5, which is firmly secured to the cup 4 by bolts 6 so that the cap member becomes in effect a part of the cup 4. If desired, the cap member 5 and the cup 4 may be fabricated from a single piece of metal.

The cup 4 and the cap 5 are both centrally apertured to permit the free passage of the stem 3, which has its threaded end slightly projecting above the top of the cap 5 to receive the adjusting member 9. Said adjusting member is in the form of a knob having a shank 13 which is internally threaded as at 12 for reception upon the threaded portion of the stem 3. The adjusting member is thus in effect, a nut, operative against a washer 17, and by rotating it the stem 3 is moved axially to flex the disk 1 and form it into cupped shape. A coil spring 8, surrounding the stem 3 and located between the top plate 7 of the cup 4 and the upper face of the disk 1 serves to keep the cup 4 and the disk 1 slightly separated when the adjusting member 9 is loosened to a sufficient extent to allow the disk 1 to assume a flat condition.

When the adjusting member 9 is sufficiently loosened, the disk 1 will be perfectly flat, the coil spring 8 then acting to hold the cup 4 loosely against the rubber disk 1 without the imposition of pressure thereon. To apply the device to the smooth surface of a sheet of glass or other smooth-faced article to be lifted and carried, it is placed with the face of the rubber disk 1 against the surface of the glass. By manual rotation of the adjusting member 9, the cup 4 is gradually and progressively forced firmly down on the rubber disk, and the stem 3 and the attached plate 2 are elevated. The effect of such elevating movement of the plate 2 is to form the rubber disk 1 into the cupped shape shown in Fig. 3, thus creating a vacuum cup which adheres with great tenacity to the surface of the glass, and which will suctionally adhere thereto indefinitely until freed from such engagement by loosening of the adjusting member 9 to a sufficient extent to allow the disk 1 to flatten out. It will thus be apparent that the device may be quickly attached to a surface by merely placing it against the same and turning the adjusting member 9 to a sufficient extent to cup the disk 1. By the threaded interengagement of the adjusting member 9 and the stem 3 a gradual and progressive shaping of the disk into cup form is secured and the imposition of sudden thrusts or suddenly imposed forces on the pane or sheet of glass is avoided, with the result that the possibility of breaking the glass is eliminated.

A bail type handle 15, pivotally attached to the cap 5, and provided with a handle part 16, permits easy lifting and transportation of the glass to which the device is attached.

The adjusting member 9, while made in the form of a knob-like element for convenience in manipulating it, may be of other form, such as a wing-nut or the like, as will be clearly understood.

However, it will be noted that when the adjusting member is made as shown in the drawing, namely, with a relatively large ball-like extremity or knob, this rounded element and the shank 13 formed integrally therewith, completely covers the threaded end portion of the stem 3 so that the hand of the operator engaging the bail-like handle 16 is not likely to be injured by scraping contact with the knob 9 in swinging the handle 16 from one side of the device to the other. Moreover, the provision of a rounded knob-like element over the stem 3 adapts the device to two-handed operation, since one hand may engage the handle 16 and the other the knob 9. This is particularly advantageous when handling large and unwieldy as well as very heavy sheets of plate glass, marble or other weighty sheet material which must not only be carefully lifted but precisely fitted into its resting place in the structure being erected. In the fitment of large sheets of material in place, a single swinging handle might be found to be inadequate to provide maximum control over the engaged sheet of glass or slab of marble which must be very carefully eased into position. Thus, the projecting knobbed member 9 allows the worker to grip it firmly and carefully guide the sheet of glass or slab of marble into place in the structure being erected, while at the same time supporting the weight of the slab or sheet with the swinging handle 16. Therefore, the member 9, in the form disclosed, not only constitutes an adjusting nut, but also a handle for co-operative use with, or supplemental to the swinging handle 16.

What I claim is:

A device of the character described comprising, a normally flat flexible disk, a stiff metal plate smaller than the disk enclosed within the disk, a stem projecting from the plate, a cup having a central opening through which the stem extends, said stem having a threaded part extending from the outer face of the cup and exposed on the outside of the cup, an adjusting member having a rounded knoblike head and a tubular, internally threaded integral extension from the head located outside of the cup and threadably engaging the exposed threaded part of the stem, said adjusting member being operative against the outer face of the cup to force the cup against the flexible disk and cause the plate to be moved oppositely to the cup to form the disk into cupped shape, a swinging handle attached to the cup and of a length to enable it to be swung over the top of and to one side of the adjusting member whereby said handle and the adjusting member may be either simultaneously or independently used as handles in lifting and controlling sheet material with which the device is suctionally engaged.

ABRAHAM L. COHEN.